United States Patent [19]

Granzow

[11] 4,299,760
[45] Nov. 10, 1981

[54] FLAME RETARDED, RUBBER-MODIFIED, POLYPHENYLENE ETHER RESIN COMPOSITIONS

[75] Inventor: Albrecht H. Granzow, Somerset, N.J.

[73] Assignee: American Cyanamid Company, Stamford, Conn.

[21] Appl. No.: 78,533

[22] Filed: Sep. 24, 1979

[51] Int. Cl.$^3$ .............................................. C08L 71/04
[52] U.S. Cl. .............................................. 260/45.9 KA
[58] Field of Search ................................ 260/45.9 KA

[56] References Cited

U.S. PATENT DOCUMENTS

| | | | |
|---|---|---|---|
| 3,032,589 | 5/1962 | Hoffmann et al. | 260/45.7 P |
| 3,284,543 | 11/1966 | Gillham et al. | 260/45.7 P |
| 3,370,030 | 2/1968 | Cannelongo | 260/28.5 R |
| 3,895,048 | 7/1975 | Hoffmann | 260/45.9 KA |
| 4,024,093 | 5/1977 | Abolins et al. | 260/23 S |

*Primary Examiner*—Maurice J. Welsh
*Attorney, Agent, or Firm*—Bruce F. Jacobs

[57] ABSTRACT

Flame retardant polyphenylene ether resins are prepared using phosphine oxides of the formula:

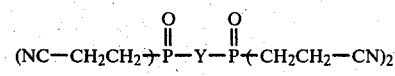

wherein Y is alkylene, substituted xylylene, bis(methylene)anthrylene, and bis(methylene)tetrahydronaphthalene.

5 Claims, No Drawings

FLAME RETARDED, RUBBER-MODIFIED, POLYPHENYLENE ETHER RESIN COMPOSITIONS

The present invention relates to flame retarded, polyphenylene ether resin compositions containing an effective flame retarding amount of a phosphine oxide compound represented by the formula:

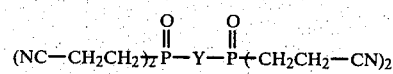

wherein the group Y is selected from:
(1) alkylene, $-(CH_2)_n-$ wherein n is an integer from 1 to 4;
(2) substituted xylylene

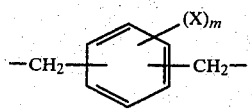

wherein each X is a halogen atom or an alkyl group with 1 to 4 carbon atoms and m is an integer from 1 to 4, with the proviso that when no X is halogen the methylene groups are meta to each other;
(3) the group,

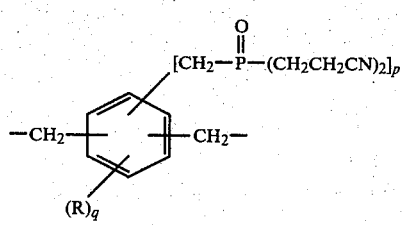

wherein p is an integer of at least 1, R is alkyl of 1 to 4 carbon atoms, and q is O or 4-p;
(4) the group,

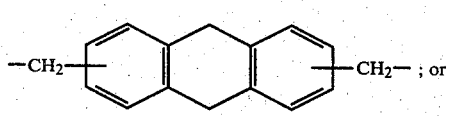

(5) the group,

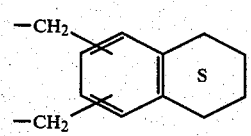

The phosphine oxide compounds of the above formula, which are useful in the present invention, are disclosed in U.S. Pat. Nos. 3,284,543 and 3,835,119.

Compounds of the above formula, where Y is alkylene of 1 to 4 carbon atoms, may be prepared by oxidation of the corresponding bis phosphine compound (see Chatt et al., J. Chem. Soc. 1960, p. 1378, and Hewertson et al., J. Chem. Soc. 1960, p. 1490) with hydrogen peroxide or oxygen; see U.S. Pat. No. 3,032,589 or Berichte 92, 3175 (1954). The other compounds may be readily prepared by reacting the corresponding halomethyl intermediate with bis(2-cyanoethyl)phosphine oxide in accordance with the general reaction:

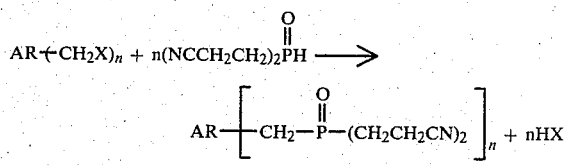

wherein AR represents an aromatic ring system.

Flame retardant, rubber-modified, polyphenylene ether resin compositions are made by incorporating therein an effective flame retarding amount of a compound of the above formula.

The polyphenylene ether resin compositions, suitable for use in the present invention, are described in U.S. Pat. No. 4,024,093, incorporated herein by reference. Basically, these resins comprise about 10 to 90 parts by weight of polyphenylene ether and about 90 to 10 parts by weight of a styrene polymer. Preferably, the polymer contains about 50 to 80 parts by weight of polyphenylene ether and about 50 to 20 parts by weight of styrene polymer. The styrene polymer is a rubber-modified, high-impact polystyrene. The resins are blends of the two polymers, which are mutually soluble and form a homogeneous polymer composition.

The flame retardant compounds are used in an amount sufficient to provide a self-extinguishing composition, as described below. In general, however, the amount used is at least about 4% by weight, based on the weight of resin, preferably about 6% by weight.

The flame retardant compounds may be incorporated into the polymer by any method known in the art for doing so; however, it is preferable to incorporate the compounds by milling into the polymer on a conventional two-roll mill or by dry blending with the polymer, followed by extrusion.

It is also within the scope of the invention to incorporate such additional ingredients as plasticizers, dyes, pigments, heat and light stabilizers, antioxidants, antistatic agents, photochromic materials, and the like.

EXAMPLE 1

1,3-Bis[bis(2-cyanoethyl)phosphonylmethylene]-2,4,5,6-tetrachlorobenzene

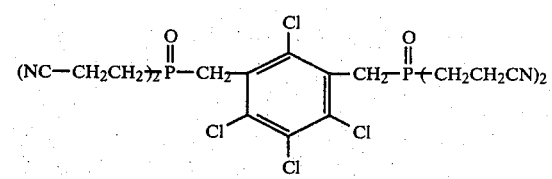

1,3-Bis(chloromethyl)-2,4,5,6-tetrachlorobenzene (15.4 g, 0.049 mole) was reacted with 15.7 grams (0.1 mole) of bis(2-cyanoethyl)phosphine oxide in 270 ml of methanol for 50 minutes at 50° C. During the reaction, a solution of 6.4 grams of potassium hydroxide in 80 ml of methanol was added. The reaction mixture was refluxed for 45 minutes and cooled. The product was isolated as a solid, m.p. 320°–323° C.

EXAMPLE 2

A total of 10 grams of a blend of 50 parts of polyphenylene ether/50 parts of rubber-modified impact polystyrene, containing 6% by weight of the compounds shown below, was extruded through a Melt Index Apparatus (described in ASTM D-1238) at 290°–300° C. The cylindrical extrudate, 3–5 inches long and 0.25 inch in diameter, was subjected to the following flammability test, described in Underwriters Laboratories Test UL-94, Vertical Test, Method 3.10–3.15 ( Sept. 1973): The polymer specimen, clamped in a vertical position, is ignited with a ¾ blue flame (methane or natural gas) for 10 seconds, and the flame is withdrawn. If the flame is extinguished within 25 seconds, the sample is reignited for 10 seconds and the flame again withdrawn. The flame extinguishment time is again recorded. If the flame extinguishment time does not exceed 5 seconds for either flame application, the sample is rated V-O; if the flame extinguishment time for either the first or second flame application is between 5 and 25 seconds, the sample is rated V-1. If a sample shows extinguishment times exceeding 25 seconds for either flame application, it is rated free-burning (FB) and is considered to have failed the test.

The following compounds are rated either V-O or V-1, according to the test, when incorporated into the resin at 6% by weight:

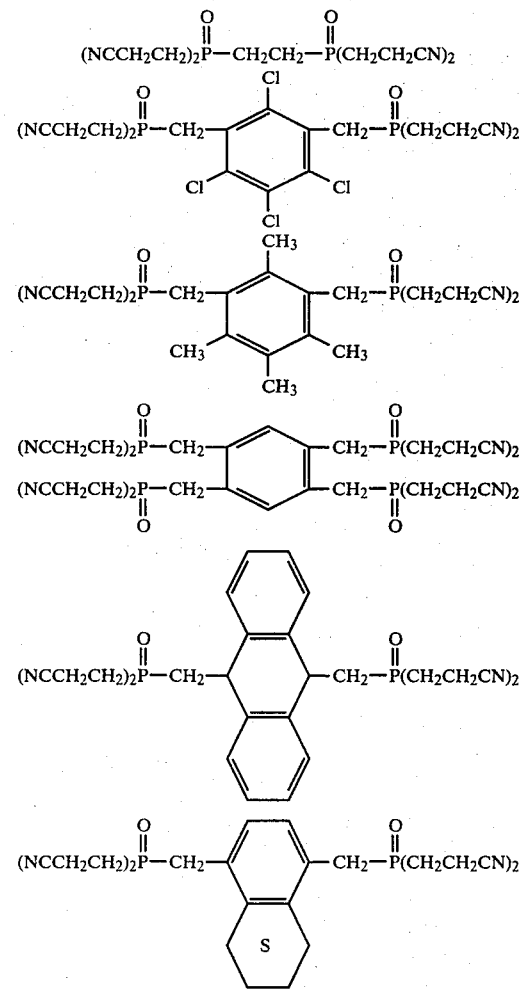

EXAMPLE 3

The procedure of Example 2 is repeated except that the blend contains 70 parts of polyphenylene ether resin and 30 parts of polystyrene. When tested at a concentration of 4% by weight, the compounds are rated either V-O or V-1, according to the test.

EXAMPLE 4

Following the procedure of Example 2, a determination was made of the flammability rating of a high-impact polystyrene containing 20% by weight of the compounds identified therein. When determined according to the UL-94 procedure, the specimens were free-burning (FB).

The examples illustrate that (1) for a 50/50 blend of polyphenylene ether resin, the compounds must be used at a concentration of at least 6% by weight to be effective flame retardants; (2) for a 70/30 blend, at least 4% by weight of the compound is required; and (3) the compounds are not effective flame retardants for polystyrene even at a concentration of 20% by weight.

What is claimed is:

1. A flame retardant composition comprising a homogeneous blend of polymers containing about 10 to 90 parts by weight of polyphenylene ether resin, about 90 to 10 parts by weight of a polystyrene, and a flame retarding, effective amount of a compound represented by the formula:

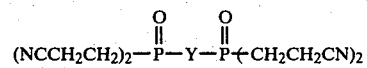

wherein Y is selected from:

(1) alkylene, $-(CH_2)_n-$, wherein n is an integer from 1 to 4;

(2) substituted xylylene

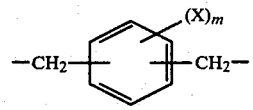

wherein X is a halogen atom or an alkyl group containing 1 to 4 carbon atoms and m is an integer from 1 to 4, with the proviso that when no X is halogen the methylene groups are meta to each other;

(3) the group,

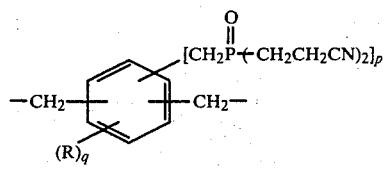

wherein R is alkyl of 1 to 4 carbon atoms, p is an integer of at least 1 and q is O or 4-p;

(4) the group,

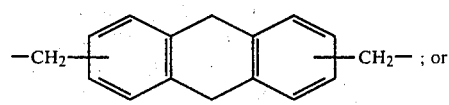

(5) the group,

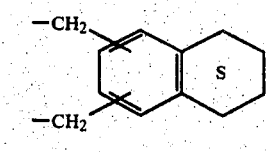

2. The composition of claim 1 wherein the blend contains about 50 to 80 parts by weight of polyphenylene ether resin and 50 to 20 parts by weight of styrene polymer.

3. The composition of claim 1 wherein Y is selected from the group consisting essentially of

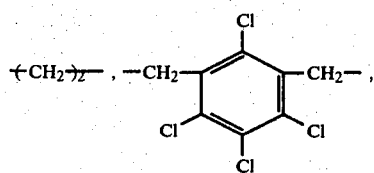

-continued

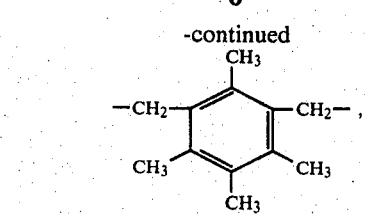

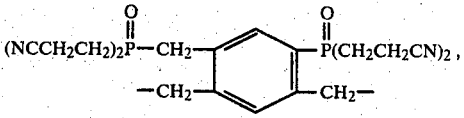

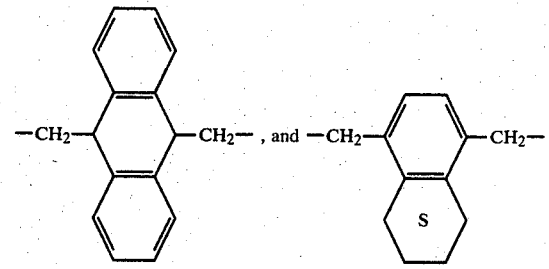

4. The composition of claims 1 or 3 wherein the blend is about 70 parts polyphenylene ether and about 30 parts polystyrene, and the phosphine oxide is incorporated in an amount of at least 4% by weight upon the blend of polymers.

5. The composition of claims 1 or 3 wherein the blend is about 50 parts polyphenylene ether and about 50 parts polystyrene, and the phosphine oxide is incorporated in an amount of at least 6% by weight based upon the blend of polymers.

* * * * *